Patented Jan. 12, 1954

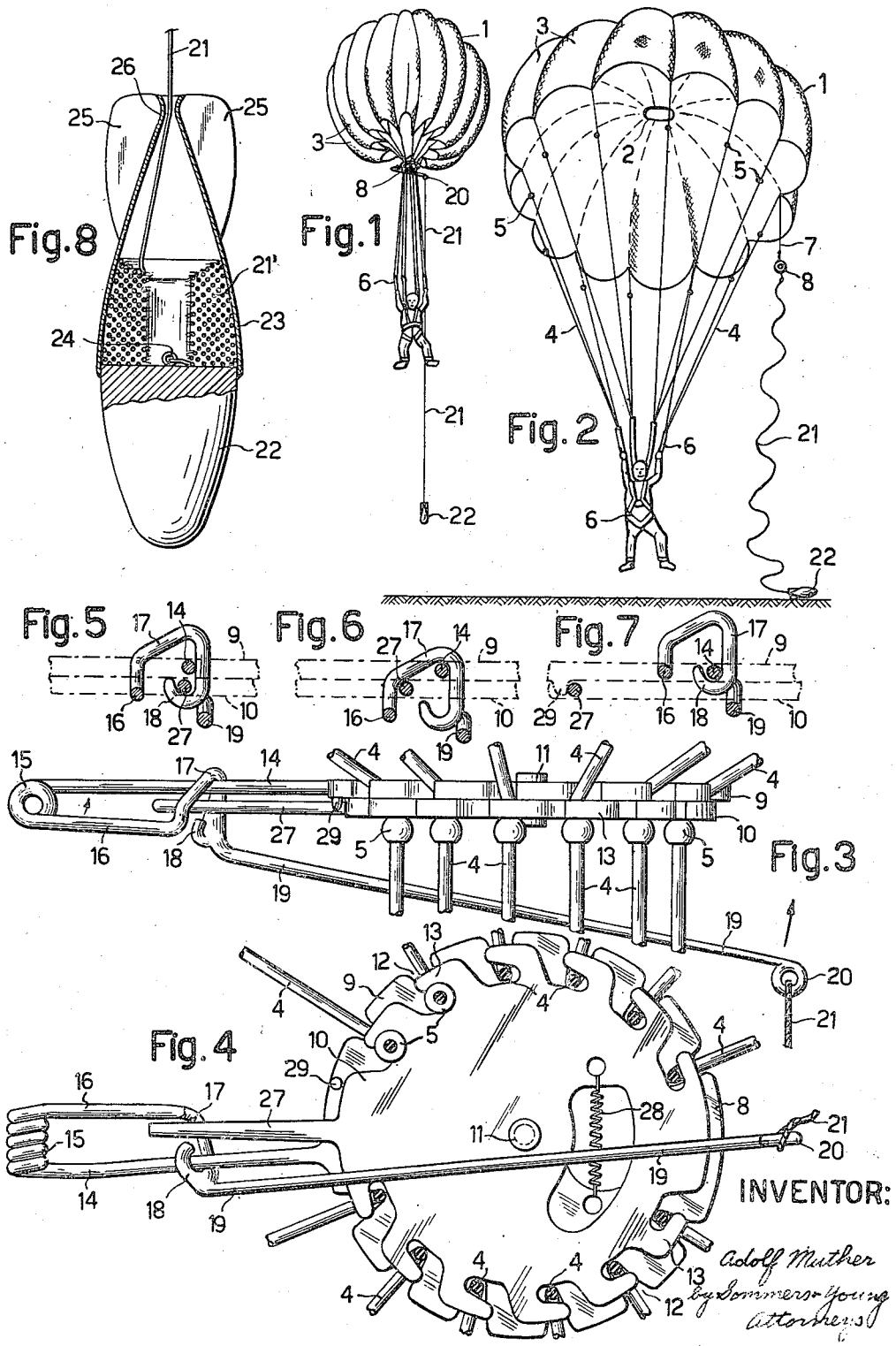

2,665,863

UNITED STATES PATENT OFFICE 2,665,863

PARACHUTE WITH DELAYED LANDING-SPEED

Adolf Muther, Zurich, Switzerland

Application August 3, 1949, Serial No. 108,251

Claims priority, application Switzerland
August 9, 1948

4 Claims. (Cl. 244—150)

It is desirable from various reasons to brake the speed of landing of a parachute when the latter approaches the ground. Such delayed landing speed is attained by more fully or fully opening the parachute. For such purpose, mechanical means built in the manner of clockworks are used, which operate after a predetermined length of time has elapsed, or an apparatus is used which responds to a predetermined atmospheric pressure. Such mechanical means or apparatus are relatively complicated and do not act positively.

It is a primary object of my presnet invention to provide relatively simple and positively-acting means for fully opening the parachute after the latter has reached a predetermined elevation above the ground, for the purpose of braking the speed of landing of the parachute.

One form of my present invention is illustrated in the accompanying drawing in which—

Fig. 1 is a schematical perspective view of the parachute which is only partly opened, Fig. 2 is a further, schematical perspective view, in a somewhat larger scale, in which the parachute is fully opened, Figs. 3 and 4 show, in larger scale, the closure mechanism including a locking device, in a side view and a bottom plan view respectively, Figs. 5–7 show the locking device in three different operative states, and Fig. 8 shows the pilot weight in axial section.

In Figs. 1 and 2, the numeral 1 designates the parachute with a crown or apex opening 2 from which issue the various longitudinally bonded fabric webs 3. A guy rope 4 is secured at each web junction, and a stop means 5 is adjustably attached to each rope 4. Supporting straps or belts 6 are secured to the free ends of the ropes 4. A closure mechanism 8 is connected to one of the ropes 4 through a pull line 7, and comprises two adjacent circular disks 9 and 10 (Figs. 3, 4) which are rotatably interconnected through a central stud pin 11. The disk 9 is provided on its circumference with uniformly spaced radial notches 12 to which are associated a corresponding number of locking hocks or lugs 13 provided on the circumference of the disk 10. The said notches 12 in disk 9 serve for receiving a guy rope 4 each. As shown in Figs. 3 and 4, the guy ropes 4 are secured in the said notches 12 through the locking hocks 13 of disk 10. The two disks 9 and 10 are secured in their respective relative position through a locking device. The latter comprises a spring-wire cantilever 14 which is extended to form a coiled torsional spring 15, a straight leg 16, an eyelet 17 including a catch lug 18, and a straight arm 19 which terminates in a boss 20. The cord 21 of a pilot weight 22 is secured in the boss 20. The pilot weight 22, from aerodynamical reasons, suitably is shaped like a raindrop.

The rear portion 23 of the weight 22 (Fig. 8) is hollow and accommodates the cord 21 in form of a ball 21' as long as the parachute is not opened or not used. The respective end of cord 21 is secured to a ring 24 of the weight 22 which at its rear end comprises a plurality of leading or stabilizing fins 25. The cord 21 passes from the hollow body 23 through a narrow opening 26 provided on the axis of the pilot weight 22. At the rear end of the latter an elastic brake (not shown) is provided for the purpose of regulating the run of the cord 21 when the parachute is used. The cord 21 then is unwound from the inside of the ball 21'.

The said eyelet 17 receives a locking arm 27 which is secured to the disk 10 (Figs. 3, 4). The said arm is lodged in the catch lug 18 as shown in Fig. 5, thus interlocking the two disks 9 and 10. In this position, a tension spring 28 (Fig. 4) which engages the two disks 9 and 10, is tensioned. The guy ropes 4 are bundled on the closure mechanism 8 or respectively, on the closure disks 9 and 10, i. e. at a certain relatively small distance from the rim of the parachute 1.

When the parachute is in use, the following actions take place:

The parachute 1 is inflated at the beginning of the descent through the air entering from below, and the guy ropes 4 are tautened. The stops 5 on the ropes 4 abut against the lower disk 10, and the parachute is opened partially, i. e. to a predetermined extent. In this state (Fig. 1) the parachute has a high rate of descent. The cord 21 is unwound from the ball 21' through the pilot weight 22 which is released or tripped when the parachute is inflated, and the cord 21 thus is tautened. The free arm 19 of the said locking device is pulled downwardly through the pilot weight 22 against the action of the torsional spring 15 so that the locking device passes from the operative position illustrated in Fig. 5 to the intermediate position shown in Fig. 6 in which the eyelet 17 abuts against the cantilever 14 of the upper disk 9. Further, the locking arm 27 of the lower disk 10, which arm is retained in the operative position (Fig. 5) of the locking device in the catch lug 18, is released from the latter, whereupon the tension spring 28 causes a certain relative rotation between the disks 9 and 10, which rotation is limited, as shown in Fig. 6, through the locking arm 27 which abuts against the eyelet 17. Such rotation is so small that the guy ropes 4 remain secured on the disks 9 and 10. When, subsequently, the pilot weight 22, as shown in Fig. 2, hits the ground and the cord 21 thus is slacked, the free arm 19 of the locking device is swung upward and there results the release state (Fig. 7) of the locking device. The cantilever 14 of the upper closure disk 9 then is held by the catch lug 18 of the locking device, the locking arm 27 of the lower disk 10 has been released from the eyelet 17, and the two disks 9 and 10 have been rotated relatively to each other so that the locking hocks 13 of disk 10 have been moved out of the range of the radial notches 12 of disk 9 and the guy ropes 4 have been tripped from the closure mechanism. The said relative rotation between the disks 9 and 10 is limited through a projection 29 provided on the disk 9, through which the locking arm 27 is held up.

Due to the release of the closure mechanism, the parachute 1 is entirely opened through the action of the air so as to produce the condition shown in Fig. 2 in which the rate of descent of the parachute is reduced in accordance with the increase of its volume with respect to the preceding stage (Fig. 1) in which the parachute is only partly opened.

On the basis of the preceding explanations it will be readily understood how one has to proceed in order to bring the parachute in the state of non-use.

The guy ropes 4 suitably are made of rubber so that they will be elongated through the suspended load when the parachute is used. Such elongation is substantially increased in the moment of the full development of the parachute after releasing the closure mechanism, on one hand through the suddenly arising greater air pressure through the parachute and, on the other hand, through the kinetic energy of the suspended dropping load. Such increment in elongation lasts until the dropping load has been retarded down to the rate of descent of the fully opened parachute. The guy ropes 4, are then contracted again, that is, the descent of the load is still further retarded. Such additional speed-braking effect is very substantial; under certain conditions, i. e. if such proves to be necessary or of advantage, the rate of descent of the load may be momentarily decreased to zero. The moment of the maximum braking effect, i. e. of the minimum rate of descent of the load, may be made to coincide with the moment of contacting the ground through accurately determining the length of the pilot-weight cord, i. e. the elevation above the ground at which the parachute is fully opened, so that the load is gently landed.

The opening width of the parachute for its initial, only partial opening may be varied through adjusting the stops 5 disposed on the guy ropes 4, which stops co-act with the closure disk 10. Such opening width defines the rate of descent of the parachute.

The mass of the pilot weight 22 has to be adapted to the conditions to be encountered, i. e. to the envisaged rate of descent of the parachute. The cord 21 may be thickened somewhat at its end portion adjacent the pilot weight 22 so that when the said portion passes through the brake disposed on the weight 22, the braking effect on the cord 21 is increased so as to avoid a too abrupt jerk in the moment when the cord has been entirely unwound. The brake (not shown) suitably is so connected to the stabilizing fins 25 of the weight 22 that the heat of friction arising in the brake is transmitted onto a cooling area which is as large as possible.

If desired, an electrical contact wire may be connected to the pilot weight, which closes a circuit when the weight hits the ground, for the purpose of releasing the closure mechanism electrically.

What I claim as new and desire to secure by Letters Patent, is:

1. A parachute having means serving on one hand for accelerating the fall and on the other hand for automatically bringing about a smooth landing of the load, comprising a closure mechanism provided with a locking device, which mechanism is intended for bundling the guy ropes at a certain distance from the parachute rim so as to initially unfold the parachute in use only to a limited extent, said closure mechanism comprising two rotatably interconnected disks, one of the latter being circumferentially notched and the other being provided with catch lugs for securing the guy ropes in the said notches, each said disk comprising a portion of the locking device and being interconnected through a spring which is adapted to rotate the two disks relatively to each other upon releasing the locking device for the purpose of liberating the guy ropes, a pilot element of comparatively light weight and having a correspondingly thin pilot element line which connects the pilot element with the said locking device, and an arrangement for disengaging the locking device when the pilot element hits the ground so that the said closure mechanism at a predetermined exact height above the ground may open for the purpose of a sudden additional unfolding of the parachute shortly before the landing.

2. A parachute as defined in claim 1, in which the said closure mechanism comprises two disks rotatable relatively to each other in a limited sense, one of said disks being provided with a cantilever bar comprising a spring, an eyelet enclosing the said bar, a catch hook, and a free arm having a cord and pilot weight secured to the end thereof, and the other disk comprising a locking arm which in the operative state of said closure mechanism is retained in the said catch hook, whilst when the said mechanism is open the said cantilever bar is disposed in the said catch hook and the said locking arm has moved out of the said eyelet.

3. A parachute as defined in claim 1, in which the said closure mechanism comprises two disks rotatable relatively to each other in a limited sense, one of said disks being provided with circumferential notches and the other disk with catch lugs for temporarily securing the guy ropes in said notches, the said guy ropes being provided with an adjustable stop each for co-operation with one of said disks, and the two said disks being equipped with a portion each of said locking device.

4. A parachute as defined in claim 1, in which the said guy ropes comprise a stop each for co-operation with the said closure mechanism and are made of rubber.

ADOLF MUTHER.

References Cited in the file of this patent

UNITED STATES PATENTS

| Number | Name | Date |
|--------|------|------|
| 1,783,452 | Reed | Dec. 2, 1930 |
| 1,843,597 | Coffman | Feb. 2, 1932 |
| 2,414,284 | Bacon | Jan. 14, 1947 |

FOREIGN PATENTS

| Number | Country | Date |
|--------|---------|------|
| 538,414 | France | Mar. 18, 1922 |
| 688,753 | France | May 19, 1930 |